(12) United States Patent
Wang

(10) Patent No.: US 10,706,062 B2
(45) Date of Patent: Jul. 7, 2020

(54) METHOD AND SYSTEM FOR EXCHANGING DATA FROM A BIG DATA SOURCE TO A BIG DATA TARGET CORRESPONDING TO COMPONENTS OF THE BIG DATA SOURCE

(71) Applicant: ZTE Corporation, Shenzhen (CN)

(72) Inventor: Dong Wang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 250 days.

(21) Appl. No.: 15/736,204

(22) PCT Filed: Jun. 6, 2016

(86) PCT No.: PCT/CN2016/084954
§ 371 (c)(1),
(2) Date: Dec. 13, 2017

(87) PCT Pub. No.: WO2017/008598
PCT Pub. Date: Jan. 19, 2017

(65) Prior Publication Data
US 2018/0181631 A1    Jun. 28, 2018

(30) Foreign Application Priority Data
Jul. 10, 2015  (CN) .......................... 2015 1 0405965

(51) Int. Cl.
*G06F 16/25* (2019.01)
*G06F 16/00* (2019.01)
*G06F 16/23* (2019.01)

(52) U.S. Cl.
CPC ............ *G06F 16/254* (2019.01); *G06F 16/00* (2019.01); *G06F 16/23* (2019.01)

(58) Field of Classification Search
CPC ..................................................... G06F 16/254
(Continued)

(56) References Cited

U.S. PATENT DOCUMENTS

2006/0010195 A1* 1/2006 Mamou .................. G06Q 10/10
709/203
2008/0255974 A1   10/2008 Jacob
(Continued)

FOREIGN PATENT DOCUMENTS

| CN | 102081656 A | 6/2011 |
| CN | 102546730 A | 4/2012 |

(Continued)

OTHER PUBLICATIONS

International Search Report Application No. PCT/CN2016/084954; dated Aug. 26, 2016; pp. 4.
(Continued)

*Primary Examiner* — Pierre M Vital
*Assistant Examiner* — Andrew N Ho
(74) *Attorney, Agent, or Firm* — Cantor Colburn LLP

(57) ABSTRACT

A method and system for big data exchange is provided. The method includes a big data source collects various data and provides the various data to a big data exchanger; the big data exchanger receives the various data imported from the big data source, processes the various data to obtain processed data, and exports the various data and the processed data to a big data target according to a data request of the big data target; the big data target sends the data request to the big data exchanger and receives the various data and the processed data, corresponding to the data request, which are exported from the big data exchanger.

13 Claims, 2 Drawing Sheets

(58) Field of Classification Search
USPC .......................................................... 707/602
See application file for complete search history.

(56) References Cited

U.S. PATENT DOCUMENTS

2008/0288889 A1* 11/2008 Hunt ...................... G06Q 30/02
715/810
2011/0087714 A1 4/2011 He
2015/0074165 A1* 3/2015 Rahardja ................. H04L 67/10
709/201

FOREIGN PATENT DOCUMENTS

CN 103731298 A 4/2014
CN 104699855 A 6/2015

OTHER PUBLICATIONS

European Search Report for corresponding application EP16823745; Report dated Jun. 27, 2018.

* cited by examiner

METHOD AND SYSTEM FOR EXCHANGING DATA FROM A BIG DATA SOURCE TO A BIG DATA TARGET CORRESPONDING TO COMPONENTS OF THE BIG DATA SOURCE

TECHNICAL FIELD

Embodiments of present disclosure relates to the field of communications, and in particular to a method and system for big data exchange.

BACKGROUND TECHNOLOGY

At present, big data has become a technical hot spot in the current industry. And particularly, with the deployment of cloud computing services, great expectations are placed on the big data, which serves as the most important business application of the cloud computing services.

The big data is mainly characterized in that a volume of the big data is large, there is a multiple variety of the big data, speed of the big data is high and the value of the big data is high. Data characteristics of multi-source, heterogeneous and magnanimity are accompanied at the same time.

Data types involved in the big data include a structured type, a semi-structured type and an un-structured type and the like, so that a big data exchange system needs to distinguish and process these different data types. For example, collection, abnormal data cleaning, Extraction Transform Load (ETL) of structured database data, and incremental real-time collection, analysis, annotation, abnormal data cleaning, data segmentation, feature extraction, storage and caching, batch non-real-time processing of semi-structured data and non-structured data and the like.

Data objects involved in the big data include words, voices, videos, images, web pages, sensor data and the like, so that the big data exchange system needs to specifically distinguish and process data bearing formats corresponding to different data objects. The data bearing formats include, but not limited to, a text file, an audio file, an adaptation file, an image file and a webpage file, a sensor data file and corresponding real-time or quasi-real-time streaming media data.

In the related art, big data are gradually applied to all industries. However, as a volume of data is gradually increased, types of the data are increasingly complex, a generated speed of the data is rapidly increased, and a demand for a potential value utilization of the data is enhanced, the big data is subject to some new difficulties and faces new challenges which include the following points.

One, big data cannot be opened, shared and interconnected due to an islanding of the big data, so that a possibility that big data users share data of different industries and even different departments of the same industry is reduced.

Two, a large amount of the big data, lack of value measurement means and monetization means, having a huge potential value weakens enthusiasm of data owners to open data.

Three, lack of existing public data hinders public social resources from contribution of possible social life and economic activities.

Four, lack of an effective business mode, especially an efficient data exchange mechanism prevents safe and effective data exchange between data owners and data users.

Five, lack of interconnection and interworking standards cannot guarantee interconnection between big data providers and big data service providers.

For fully mining huge potential value from a large amount, various types and high-speed changes of big data, various problems and related challenges mentioned above are needed to be solved. However, in the related art, no effective solution is provided for problems of incapability of opening, interconnection and sharing of big data.

SUMMARY

At least some embodiments of present disclosure provide a method and system for big data exchange, so as at least to partially solve problems of incapability of opening, interconnection and sharing of big data in related art.

One embodiment of the present disclosure provides a system for big data exchange, which includes: a big data source, a big data exchanger and a big data target; and the big data source is arranged to collect various data, and provides the various data to the big data exchanger; the big data exchanger is arranged to receive the various data imported by the big data source, process the various data to obtain processed data, and export the various data and the processed data to the big data target according to a data request of the big data target; the big data target is arranged to send the data request to the big data exchanger and receive the various data and the processed data correspond to the request exported by the big data exchanger.

In an exemplary embodiment, the big data source includes at least one of the following: a data production component, a data owner component, a data broker component, a data proxy component, a data ingest adaptation component and a data collection component, and the data production component is arranged to produce data or combining several types of data into new data; the data owner component is arranged to hold data and authorize to access the data; the data broker component is arranged to not directly produce data, and purchase the data from the data production component or the data owner component through an authorization protocol; the data proxy component is arranged to not directly produce data and replace the data production component to hold data; the data ingest adaptation component is arranged to receive data from an external data source and adapt the data ingested from the external data source according to a processing demand of the big data source; the data collection component is arranged to collect data from at least one of the data production component, the data proxy component, the data owner component, the data broker component and the data ingest adaptation component, and adapt, configure and manage different collection methods, collection interfaces and data processing ways.

In an exemplary embodiment, the big data exchanger includes at least one of the following: a data import component, a data collection component, a data preparation component, a data analysis component, a data visualization component and a data export component; and the data import component is arranged to receive data from the big data source, and store and/or cache the data, and a way of receiving, by the data import component, the data includes at least one of the following: data query, data request, data fetching, data provision, data discovery, metadata publishing and metadata notification; the data collecting component is arranged to collect data from imported data and perform preliminary processing on the data, and provides a corresponding preliminary processing result to the data preparation component and the data export component; the data preparation component is arranged to perform preparation processing on the preliminary processed data and provide a corresponding preparation processing result to the data analysis component and the data export component, and the preparation processing includes at least one of the following: data cleaning, data conversion, data decomposition, data verification, data fusion, data aggregation, data clustering, data sorting, data abstraction, data classification, data encryption and data integration; the data analysis component is arranged to, according to the big data science, analyze data which is processed through data preparation by using a preset algorithm and extract knowledge data from the analyzed data, and provide a corresponding analysis processing result to the data visualization component and the data export component; the data visualization component is arranged to perform visual processing on data which is processed through data analysis, and provides a corresponding visual processing result to the data export component; the data export component is arranged to export the data imported from the big data source and visual processed data to the big data target.

Another embodiment of the present disclosure provides a method for big data exchange which includes that: collecting, by a big data source, various data, and providing, by the big data source, the various data to a big data exchanger; receiving, by the big data exchanger, the various data imported from the big data source, processing, by the big data exchanger, the various data to obtain processed data, and exporting, by the big data exchanger, the various data and the processed data to a big data target according to a data request of the big data target; sending, by the big data target, the data request to the big data exchanger, and receiving, by the big data target, the various data and the processed data, corresponding to the data request, which are exported from the big data exchanger.

In an exemplary embodiment, collecting, by the big data source, various data, and providing, by the big data source, the various data to the big data exchanger includes: collecting, by the big data source, various data, and providing, by the big data source, the various data to the big data exchanger through a data production component, a data owner component, a data broker component, a data proxy component, a data ingest adaptation component and a data collection component, and the data production component is arranged to produce data or combining several types of data into new data; the data owner component is arranged to hold data and authorize to access the data; the data broker component is arranged to not directly produce data, and purchase the data from the data production component or the data owner component through an authorization protocol; the data proxy component is arranged to not directly produce data and replace the data production component to hold data; the data ingest adaptation component is arranged to receive data from an external data source and adapt the data ingested from the external data source according to a processing demand of the big data source; the data collection component is arranged to collect data from at least one of the data production component, the data proxy component, the data owner component, the data broker component and the data ingest adaptation component, and adapt, configure and manage different collection methods, collection interfaces and data processing ways.

In an exemplary embodiment, collecting, by the big data source, various data, and providing, by the big data source, the various data to the big data exchanger through the data production component, the data owner component, the data broker component, the data proxy component, the data ingest adaptation component and the data collection component including at least one of the following: acquiring, by the big data source, original data from the data production component, the data proxy component and the data owner component; acquiring, by the big data source, original data from the data owner and the data broker; ingesting, by the big data source, data of an external data source from the data ingest adaptor.

In an exemplary embodiment, receiving, by the big data exchanger, the various data imported from the big data source, processing, by the big data exchanger, the various data to obtain processed data, and exporting, by the big data exchanger, the various data and the processed data to the big data target according to the data request of the big data target including: performing, by the big data exchanger, corresponding processing on data imported from the big data source through at least one of data collection, data preparation, data analysis and data visualization to output the processed data, and the processed data includes at least one of the following: collected data, prepared data, analyzed data and action data, and exporting, by the big data exchanger, the various data and the processed data to the big data target according to the data request of the big data target.

In an exemplary embodiment, receiving, by the big data target, the various data and the processed data, corresponding to the data request, which are exported from the big data exchanger includes: receiving, the big data target, the various data and at least one of collected data, prepared data, analyzed data and action data, corresponding to the data request, which are exported from the big data exchanger.

In an exemplary embodiment, the various data imported from the big data source refers to received, stored and/or cached data imported from the big data source and data annotated by metadata; collected data refers to outputted data which is processed through collecting; prepared data refers to outputted data which is processed through preparing, and the prepared data includes at least one of the following: cleaned data, conversed data, decomposed data, verified data, fused data, aggregated data, clustered data, sorted data, abstracted data, classified data, encrypted data and integrated data; analyzed data refers to outputted data which is processed through data analysis; action data refers to outputted data which is processed through visualization.

In an exemplary embodiment, exporting, by the big data exchanger, the various data and the processed data to the big data target according to the data request of the big data target includes: determining, by the big data exchanger, whether to process or directly export the various data and the processed data; when the big data exchanger determines to directly export the various data and the processed data, exporting, by the big data exchanger, the various data and the processed data to the big data target according to the data request of the big data target; when the big data exchanger determines to process the various data and the processed data, continuously processing, by the big data exchanger, the various data to obtained the processed data and continuously processing, by the big data exchanger, the processed data to obtain continuously processed data.

Another embodiment of the present disclosure further provides a computer readable storage medium with the computer executable instructions; and the computer executable instructions are used for realizing the above-mentioned method According to at least some embodiments of the present disclosure, the big data source collects various data and provides the various data to the big data exchanger; the big data exchanger receives the various data imported from the big data source, processes the various data to obtain processed data, and exports the various data and the processed data to the big data target according to the data request of the big data target; the big data target sends the data request to the big data exchanger and receives the various data and the processed data, corresponding to the data request, which are exported from the big data exchanger, so that the problems that the big data cannot be opened, interconnected and shared in related art are solved, and openness, interconnectivity and sharing of the big data are achieved.

DETAILED DESCRIPTION

The present disclosure will be described below in detail with reference to the drawings and embodiments. It is important to note that the embodiments in the present disclosure and characteristics in the embodiments are combined under the condition of no conflicts.

It is important to note that terms "first", "second" and the like in the specification, claims and drawings of the present disclosure are adopted not to describe a specific sequence or order but to distinguish similar objects.

Figure 1:
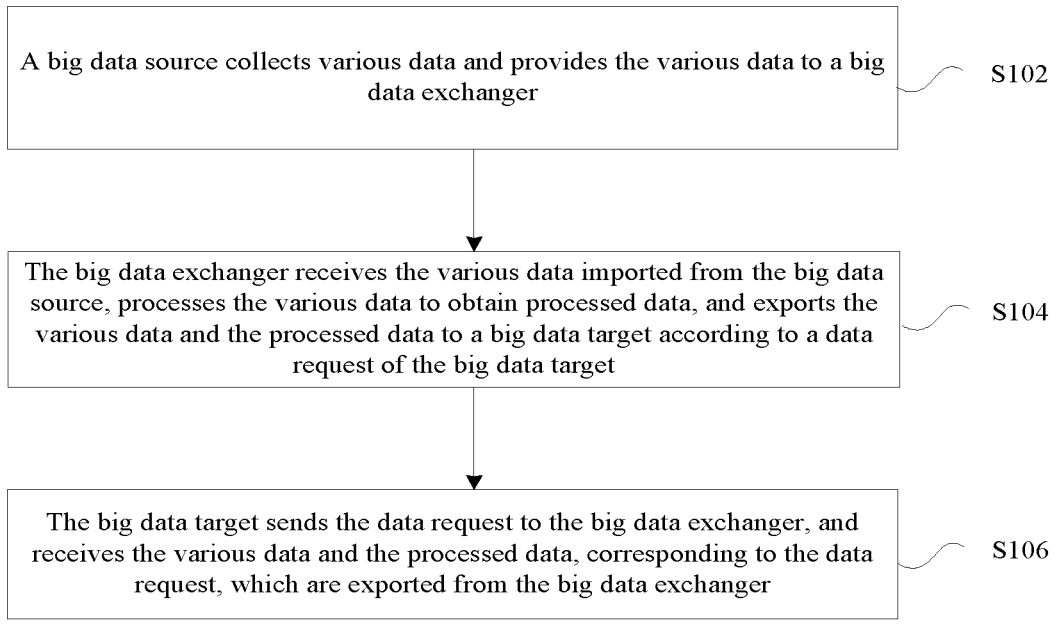
FIG. 1 is a flowchart of a method for big data exchange according to an embodiment of the present disclosure.

In one embodiment, a method for big data exchange is provided. FIG. 1 is a flowchart of a method for big data exchange according to an embodiment of the present disclosure. According to at least one embodiment as shown in FIG. 1, the method includes the following steps.

At step S102, a big data source collects various data and provides the various data to a big data exchanger.

At step S104, the big data exchanger receives the various data imported from the big data source, processes the various data to obtain processed data, and exports the various data and the processed data to a big data target according to a data request of the big data target.

At step S106, the big data target sends the data request to the big data exchanger, and receives the various data and the processed data, corresponding to the data request, which are exported from the big data exchanger.

Through above steps, the big data source collects various data and provides the various data to the big data exchanger; the big data exchanger receives the various data imported from the big data source, processes the various data to obtain processed data, and exports the various data and the processed data to the big data target according to the data request of the big data target; the big data target sends the data request to the big data exchanger and receives the various data and the processed data, corresponding to the data request, which are exported from the big data exchanger, so that the problems that the big data cannot be opened, interconnected and shared in related art are solved, and openness, interconnectivity and sharing of the big data are achieved.

In an exemplary embodiment, the big data source collects various data, and provides the various data to the big data exchanger through a data production component, a data owner component, a data broker component, a data proxy component, a data ingest adaptation component and a data collection component.

The data production component is arranged to produce data or combining several types of data into new data.

The data owner component is arranged to hold data and authorize to access the data.

The data broker component is arranged to not directly produce data, and purchase the data from the data production component or the data owner component through an authorization protocol.

The data proxy component is arranged to not directly produce data and replace the data production component to hold data.

The data ingest adaptation component is arranged to receive data from an external data source and adapt the data ingested from the external data source according to a processing demand of the big data source.

The data collection component is arranged to collect data from at least one of the data production component, the data proxy component, the data owner component, the data broker component and the data ingest adaptation component, and adapt, configure and manage different collection methods, collection interfaces and data processing ways. Adapting, configuring and managing different collection methods, collection interfaces and data processing ways refers to adapting different collection methods, different collection interfaces and different data processing ways, configuring different collection methods, different collection interfaces and different data processing ways, and managing different collection methods, different collection interfaces and different data processing ways.

In an exemplary embodiment, the step that the big data source collects the various data and provides the various data to the big data exchanger through the data production component, the data owner component, the data broker component, the data proxy component, the data ingest adaptation component and the data collection component includes at least one of the following:

(1) the big data source acquires original data from the data production component, the data proxy component and the data owner component;

(2) the big data source acquires original data from the data owner and the data broker;

(3) the big data source ingests data of an external data source from the data ingest adaptor.

In an exemplary embodiment, the step that the big data exchanger receives the various data imported from the big data source, processes the various data to obtain processed data, and exports the various data and the processed data to the big data target according to the data request of the big data target includes:

the big data exchanger performs corresponding processing on data imported from the big data source through at least one of data collection, data preparation, data analysis and data visualization to output the processed data, and the processed data includes at least one of the following: collected data, prepared data, analyzed data and action data, and exporting, by the big data exchanger, the various data and the processed data to the big data target according to the data request of the big data target.

In an exemplary embodiment, the step that the big data target receives the various data and the processed data, corresponding to the data request, which is exported from the big data exchanger includes:

the big data target receives the various data and at least one of collected data, prepared data, analyzed data and action data, corresponding to the data request, which are exported from the big data exchanger.

In an exemplary embodiment, the various data imported from the big data source refers to received, stored and/or cached data imported from the big data source and data annotated by metadata.

Collected data refers to outputted data, which is processed through collecting.

Prepared data refers to outputted data, which is processed through preparing, and the prepared data includes at least one of the following: cleaned data, conversed data, decomposed data, verified data, fused data, aggregated data, clustered data, sorted data, abstracted data, classified data, encrypted data and integrated data.

Analyzed data refers to outputted data, which is processed through data analysis.

Action data refers to outputted data, which is processed through visualization.

In an exemplary embodiment, the big data exchanger determines whether to process or directly export the various data and the processed data. When the big data exchanger determines to directly export the various data and the processed data, the big data exchanger exports the various data and the processed data to the big data target according to the data request of the big data target. When the big data exchanger determines to process the various data and the processed data, the big data exchanger continuously processes the various data to obtain the processed data and continuously processes the processed data to obtain continuously processed data.

Figure 2:
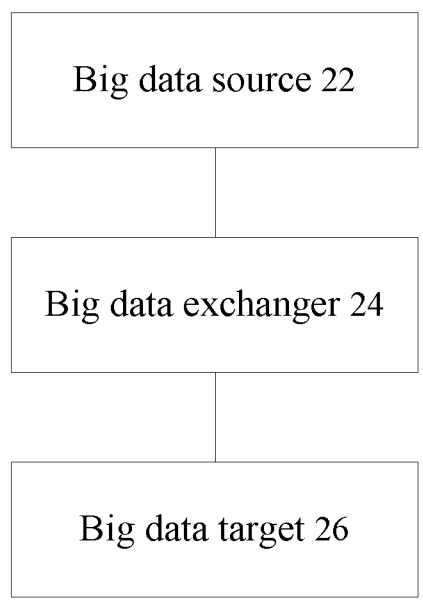
FIG. 2 is a structural block diagram of a system for big data exchange according to an embodiment of the present disclosure.

Another embodiment of the present disclosure further provides a system for big data exchange. FIG. 2 is a structural block diagram of a system for big data exchange according to an embodiment of the present disclosure. According to at least one embodiment as shown in FIG. 2, the system includes: a big data source 22, a big data exchanger 24 and a big data target 26.

The big data source 22 is arranged to collect various data, and provides the various data to the big data exchanger 24.

The big data exchanger 24 is arranged to receive the various data imported by the big data source 22, process the various data to obtain processed data, and export the various data and the processed data to the big data target 26 according to a data request of the big data target 26.

The big data target 26 is arranged to send the data request to the big data exchanger 24 and receive the various data and the processed data correspond to the request exported by the big data exchanger 24.

Through the above system, the big data source 22 collects various data and provides the various data to the big data exchanger 24; the big data exchanger 24 receives the various data imported from the big data source 22, processes the various data to obtain processed data, and exports the various data and the processed data to the big data target 26 according to the data request of the big data target 26; the big data target 26 sends the data request to the big data exchanger 24 and receives the various data and the processed data, corresponding to the data request, which are exported from the big data exchanger 24, so that the problems that the big data cannot be opened, interconnected and shared in related art are solved, and openness, interconnectivity and sharing of the big data are achieved.

In an exemplary embodiment, the big data source 22 includes at least one of the following: a data production component, a data owner component, a data broker component, a data proxy component, a data ingest adaptation component and a data collection component.

The data production component is arranged to produce data or combining several types of data into new data.

The data owner component is arranged to hold data and authorize to access the data.

The data broker component is arranged to not directly produce data, and purchase the data from the data production component or the data owner component through an authorization protocol.

The data proxy component is arranged to not directly produce data and replace the data production component to hold data.

The data ingest adaptation component is arranged to receive data from an external data source and adapt the data ingested from the external data source according to a processing demand of the big data source.

The data collection component is arranged to collect data from at least one of the data production component, the data proxy component, the data owner component, the data broker component and the data ingest adaptation component, and adapt, configure and manage different collection methods, collection interfaces and data processing ways.

In an exemplary embodiment, the big data exchanger 24 includes at least one of the following: a data import component, a data collection component, a data preparation component, a data analysis component, a data visualization component and a data export component.

The data import component is arranged to receive data from the big data source 22, and store and/or cache the data, and a way of receiving, by the data import component, the data includes at least one of the following (that is, the data import component adopts at least one of the following way to receive the data of the big data source 22): data query, data request, data fetching, data provision, data discovery, metadata publishing and metadata notification.

The data collecting component is arranged to collect data from imported data and perform preliminary processing on the data, and provides a corresponding preliminary processing result to the data preparation component and the data export component.

The data preparation component is arranged to perform preparation processing on the preliminary processed data and provide a corresponding preparation processing result to the data analysis component and the data export component, and the preparation processing includes at least one of the following: data cleaning, data conversion, data decomposition, data verification, data fusion, data aggregation, data clustering, data sorting, data abstraction, data classification, data encryption and data integration.

The data analysis component is arranged to, according to the big data science, analyze data which is processed through data preparation by using a preset algorithm and extract knowledge data from the analyzed data, and provide a corresponding analysis processing result to the data visualization component and the data export component.

The data visualization component is arranged to perform visual processing on data which is processed through data analysis, and provides a corresponding visual processing result to the data export component.

The data export component is arranged to export the data imported from the big data source 22 and visual processed data to the big data target 26. The data imported from the big data source 22 refers to data exported from the big data source 22 to the big data exchanger 24, that is, the data is received by the data import component. The processed data refers to the processing result of the data collecting component, the data preparation component, the data analysis component and the data visualization component.

The technical solution of the present disclosure is described in detail in conjunction with alternative embodiments below.

In one exemplary embodiment, a system and method for big data exchange is provided, so as to effectively solve the problems that the big data cannot be opened, interconnected and shared in related art.

In one exemplary embodiment, a system for big data exchange is provided. The system includes: a big data source, a big data exchanger and a big data target.

The big data source includes a data producer and a data owner, a data broker or data agent, a data proxy, a data ingest adaptor and a data collection component. The big data source is mainly arranged to collect various data and provide the various data to the big data exchanger. The data producer, the data owner, the broker or data agent, the data proxy and the data ingest adaptor are equivalent to the data production component, the data owner component, the broker component, the data proxy component and data ingest adaptation component mentioned in the above exemplary embodiment.

The data producer is arranged as a producer of one kind of original data or a processor of combining multiple kinds of original data into new original data.

The data owner is arranged as a power holding data and having authorization for data access.

The the broker or data agent is arranged to not directly produce data, but to purchase the data from the data producer or an original data owner through an authorization protocol so as to become a new owner of the data.

The data proxy is arranged to not directly produce data but to replace the data producer to hold digitalized, converted or transmitted data. For example, a certain internet of things gateway collects data generated by a plurality of sensors to become the data proxy.

The data ingest adaptor is arranged to receive the data from the external data source and adapt the data ingested from the external data source according to local (namely the big data source) processing demands (such as store, cache, export and the like).

The data collection component is arranged to collect the data from the data producer, the data owner, the broker or data agent, the data proxy and the data ingest adaptor, and adapt, configure and manage different collection methods, collection interfaces and data processing ways.

The data collection component is arranged to capture the original data from the data producer, the data proxy and a data owner, acquire the original data from the data owner and the data broker and ingest the data from the external data source through the data ingest adaptor.

The big data exchanger includes a data import component, a data collection component, a data preparation component, a data analysis component, a data visualization component and a data export component. The big data exchanger is mainly arranged to import the data from the big data source, perform corresponding processing (including collection, preparation, analysis and visualization) on the data to obtain the outputted data (including the collected data, the prepared data, the analyzed data and the action data), and export the data from the big data source and the outputted data to the big data target according to needs.

The data import component is configured to receive the original data from the big data source, and store and/or cache the original data. The way of receiving the original data includes at least one of the following: data query, data request, data fetching, data provision, data discovery, metadata publishing and metadata notification.

The data collection component is arranged to collect data from the imported data and perform preliminary processing (such as merging of data sets with the same structure and the like) and provide a corresponding preliminary processing result to the data preparation component and the export component.

The data preparation component is arranged to perform preparation processing on the collected data and provide a corresponding preparation processing result to the data analysis component and the export component. The way of preparation processing includes one of the following: data cleaning, data conversion, data decomposition, data verification, data fusion, data aggregation, data clustering, data sorting, data abstraction, data classification, data encryption and data integration and the like.

The data analysis component is arranged to, according to the big data science, analyze data which is processed through data preparation by using a preset algorithm and extract knowledge data from the analyzed data, and provide a corresponding analysis processing result to the data visualization component and the data export component.

The data visualization component is arranged to perform visual processing (such as delivering knowledge and statement in an optimal format and data display way) on data which is processed through data analysis, and provides a corresponding visual processing result (such as a statistical pattern, a chart, a report and the like) to the data export component.

The data export component is arranged to export the data imported from the big data source and the processed data (including collected data, prepared data, analyzed data and action data) to the big data target.

The various data imported from the big data source refers to original data received, stored and/or cached through a data imported function and original data annotated by metadata.

The collected data refers to outputted data which is processed through collecting, such as the combined data.

The prepared data refers to outputted data which is processed through preparing, and the prepared data includes at least one of the following: cleaned data, conversed data, decomposed data, verified data, fused data, aggregated data, clustered data, sorted data, abstracted data, classified data, encrypted data and integrated data.

The analyzed data refers to outputted data which is processed through data analysis. For example, the analysis processing is performed on the prepared data to derive knowledge data derived from the prepared data according to the big data science and the preset algorithm.

The action data refers to outputted data which is processed through visualization, such as visualized data, perspective data and reported data.

The data imported component is arranged to receive original data from the big data source and store and/or cache the original data.

The data exported component is arranged to transmit the imported data and the processed data (including the collected data, the prepared data, the analyzed data and the action data) to the big data target.

The big data target is mainly arranged to request the big data exchanger for the various data, including the imported data, the collected data, the prepared data, the analyzed data and the action data, and receive the various data from the big data exchanger.

In this exemplary embodiment, a method for big data exchange is further provided, which includes following steps.

A big data source collects various data from a data producer, a data owner, a data broker or data agent, a data proxy and a data ingest adapter through data capturing, data acquiring, data ingesting and the like, and provides the various data to a big data exchanger.

The big data exchanger imports (namely receives, stores and/or caches) the various data from the big data source, processes the various data through data collection, data preparation, data analysis and data visualization to output the processed data (including the collected data, the prepared data, the analyzed data and the action data) corresponding to each step and exports the various data and the processed data to a big data target according to needs.

The big data target requests required data (such as the imported data, the collected data, the prepared data, the analyzed data and the action data) to the big data exchanger, and receives the required data from the big data exchanger.

According to the technical scheme of the system for big data exchange and the implementation method of the system, a ecological system (namely a big data source, a big data exchanger and a big data target) for big data exchange and a role of the system are defined. A reference architecture and a function interface (namely a big data source function composition and activity, a big data exchanger function composition and activity and a big data target function composition and activity) for big data exchange is provided. Through regulating an ecological system, role definition, a reference framework and a function interface for big data exchange, the problems that the islanding and the closure of the big data and the big data cannot be interconnected and shared in related art are solved.

Figure 3:
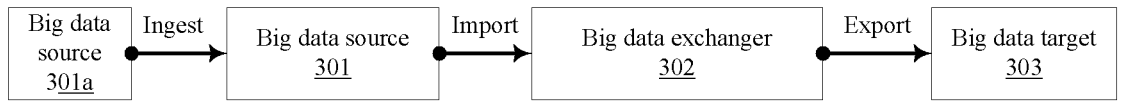
FIG. 3 is a structural block diagram of a system for big data exchange according to a first exemplary embodiment of the present disclosure.

FIG. 3 is a structural block diagram of a system for big data exchange according to a first exemplary embodiment of the present disclosure. According to at least one embodiment as shown in FIG. 3, a system structure of the big data exchange is divided into a big data source, a big data exchanger and a big data target from left to right. The big data source includes a local big data (301) and an external big data (301*a*), and data exchange is performed between the local big data (301) and an external big data (301*a*) through a data ingest interface. Data exchange is performed between a big data exchanger (302) and a big data source (301) through a data imported interface. Data exchange is performed between a big data target (303) and the big data exchanger (302) through a data exported interface.

Figure 4:
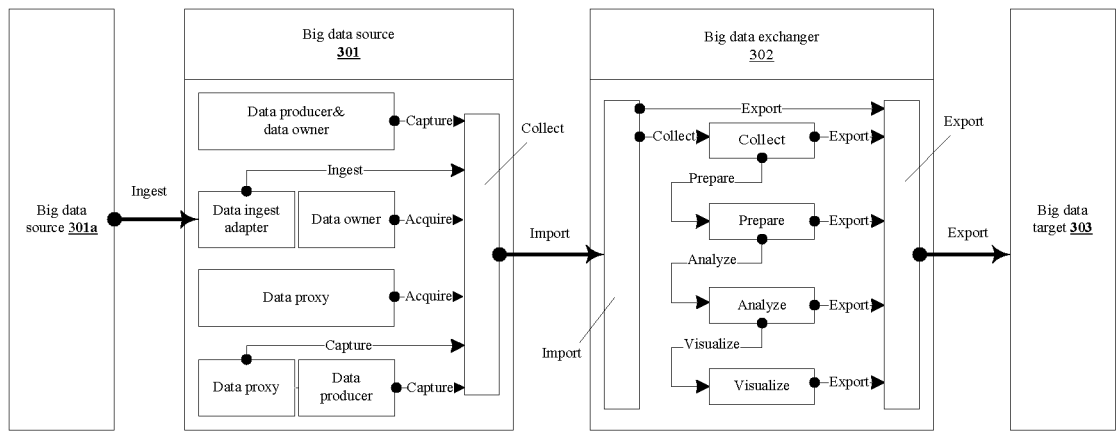
FIG. 4 is a structural block diagram of a system for big data exchange according to a second exemplary embodiment of the present disclosure.

FIG. 4 is a structural block diagram of a system for big data exchange according to a second exemplary embodiment of the present disclosure. According to at least one embodiment as shown in FIG. 4, in a system structure of big data exchange:

A big data source includes a data producer, a data owner, a data broker component, a data proxy, a data ingest adapter and a data collection component. The big data source collect data from the data producer, the data owner, the data broker component, the data proxy and the data ingest adapter through different methods of data capturing, data acquiring, data ingesting. At last, the big data source summarizes the collected data to the data collection component, so that the collected data is exported to the data exchanger.

The big data exchanger includes a data import component, a data collection component, a data preparation component, a data analysis component, a data visualization component and a data export component.

The data import component is arranged to receive original data from the big data source and store and/or cache the original data. The ways of receiving the original data includes at least one of the following: data query, data request, data capturing, data provision, data discovery, metadata publishing and metadata notification.

The data collection component is arranged to collect data from the stored and/or cached data, perform preliminary processing (such as merging data sets with the initial same structure) and provide a corresponding preliminary processing result, so as to provide the preliminary processing result to the data preparation component for processing or so that the imported data is exported to the big data target via the data exported component according to needs.

The data preparation component is arranged to perform preparation processing on the collected data and provide a corresponding preparation processing result so as to provide the preparation processing result to the data preparation component for processing or so that the prepared data is exported to the big data target via the data exported component according to needs. The ways of preparation processing includes at least one of the following: data cleaning, data conversion, data decomposition, data verification, data fusion, data aggregation, data clustering, data sorting, data abstraction, data classification, data encryption and data integration. The prepared data includes at least one of the following: cleaned data, conversed data, decomposed data, verified data, fused data, aggregated data, clustered data, sorted data, abstracted data, classified data, encrypted data and integrated data.

The data analysis component is arranged to, according to the big data science, analyze data which is processed through data preparation by using a preset algorithm and extract knowledge data from the analyzed data, and provide a corresponding analysis processing result so as to provide the analysis processing result to the data visualization component for processing or so that the processed data is exported to the big data target via the data exported component according to needs.

The data visualization component is arranged to perform visual processing (such as delivering knowledge and statement in a optimal format and data display way) on data which is processed through data analysis, and provides a corresponding visual processing result (such as a statistical pattern, a chart, a report and the like) to the big data target via the data exported component according to needs.

The data export component is arranged to export the data imported from the big data source and the processed data (including collected data, prepared data, analyzed data and action data) to the big data target.

The big data target (303) is arranged to request the big data exchanger for the various data, including the imported data, the collected data, the prepared data, the analyzed data and the action data, and receive the various data from the big data exchanger.

In the method for big data exchange, the big data source (301) collect data from the data producer, the data owner, the data broker component, the data proxy and the data ingest adapter through different methods of data capturing, data acquiring, data ingesting. At last, the big data source summarizes the collected data to the data collection component and exports the collected data to the data exchanger.

The big data exchanger (302) receives original data from the big data source and store and/or cache the original data through the data import component. In an exemplary embodiment, the big data exchanger determines whether to perform collection processing on the imported data or directly export the imported data according to a request of the big data target (303). When the big data exchanger determines to perform collection processing on the imported data, the following collection processing flow is entered. When the big data exchanger determines not to perform collection processing on the imported data, the big data exchanger directly exports the imported data to the big data target via the data export component.

The big data exchanger (302) collects data from the imported data, performs preliminary processing (such as merging data sets with the initial same structure) and provides a corresponding preliminary processing result via the data collection component. The data is called as the collected data. In an exemplary embodiment, the big data exchanger determines whether to perform preparation processing on the collected data or directly export the imported data according to a request of the big data target (303). When the big data exchanger determines to perform preparation processing on the collected data, the following preparation processing flow is entered. When the big data exchanger determines not to perform preparation processing on the collected data, the big data exchanger directly exports the imported data to the big data target via the data export component.

The big data exchanger (302) performs preparation processing on the collected data and provides a corresponding preparation processing result via the data preparation component. The data is called as the prepared data. In an exemplary embodiment, the big data exchanger determines whether to perform analysis processing on the prepared data or directly export the imported data according to a request of the big data target (303). When the big data exchanger determines to perform analysis processing on the prepared data, the following analysis processing flow is entered. When the big data exchanger determines not to perform analysis processing on the prepared data, the big data exchanger directly exports the imported data to the big data target via the data export component.

The big data exchanger (302) analyzes, according to the big data science, data which is processed through data preparation by using a preset algorithm, extracts knowledge data from the analyzed data, and provides a corresponding analysis processing result via the data analysis component. The data is called as the analyzed data. In an exemplary embodiment, the big data exchanger determines whether to perform visualization processing on the analyzed data or directly export the imported data according to a request of the big data target (303). When the big data exchanger determines to perform visualization processing on the analyzed data, the following visualization processing flow is entered. When the big data exchanger determines not to perform visualization processing on the analyzed data, the big data exchanger directly exports the imported data to the big data target via the data export component.

The big data exchanger (302) performs visual processing (such as delivering knowledge and statement in a optimal format and data display way) on data which is processed through data analysis, and provides a corresponding visual processing result (such as a statistical pattern, a chart, a report and the like) via the data visualization component. The data is called as the action data. The action data is exported to the big data target via the data exported component according to needs.

The big data exchanger (302) exports the data imported from the big data source and the processed data (including collected data, prepared data, analyzed data and action data) to the big data target via the data export component.

The big data target (303) is arranged to request the big data exchanger (302) for the various data, including the imported data, the collected data, the prepared data, the analyzed data and the action data, and receive the various data from the big data exchanger (302).

Figure 5:
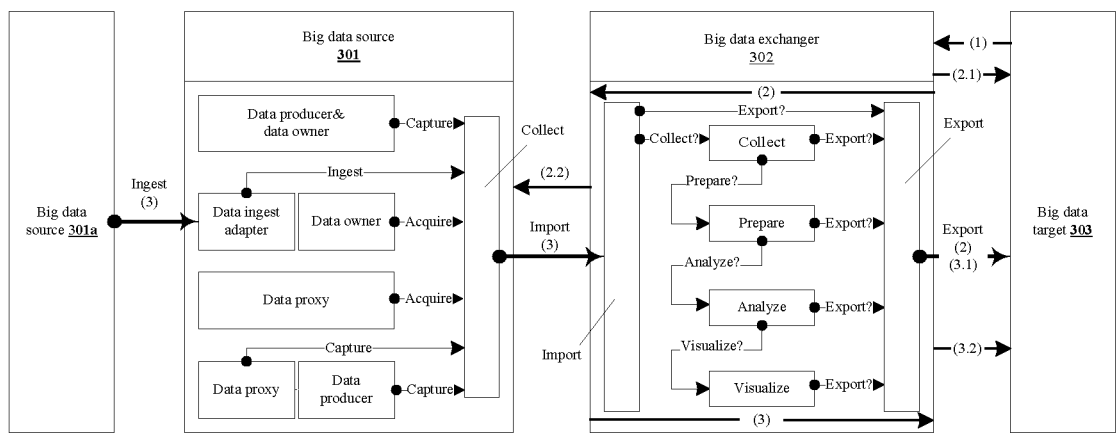
FIG. 5 is a structural block diagram of a system for big data exchange according to a third exemplary embodiment of the present disclosure.

In an exemplary embodiment, FIG. 5 is a structural block diagram of a system for big data exchange according to a third exemplary embodiment of the present disclosure. According to at least one embodiment as shown in FIG. 5, the method includes the following steps.

At step 1, a big data target (303) sends a service request with information at least including a target data type to a big data exchanger for exchanging target data (such as imported data, collected data, prepared data, analyzed data and action data).

At step 2, the big data exchanger (302) receives the service request with information at least including the target data type from the big data target (303). The big data exchanger (302) determines whether or not requested target data exists. When the requested target data exists, the requested target data is directly exported so as to realize the data exchange. When the requested target data does not exist, one of the following steps is executed.

At step 2.1, the big data exchanger (302) sends a message to the big data target (303) so as to provide a service failure response.

At step 2.2, the big data exchanger (302) starts a corresponding data import flow so as to request the big data source (301 and 301*a*) for required data, and attempts to meet a service request of the big data target (303) via a data processing flow (at least including data collection, collection preparation, data analysis, data visualization).

At step 3, through step 2.2, after the data imported from the big data source (301 and 301*a*) is processed by the big data exchanger (302), one of the following steps is executed.

At step 3.1, when the processed data meets the service request, with information at least including the target data type, of the big data target (303), the big data exchanger (302) exports the processed data to the big data target (303), so as to realize the data exchange.

At step 3.2, when the processed data does not meet the service request of the big data target (303), the big data exchanger (302) sends a service failure response to the big data target (303).

The system for big data exchange and implementation method for big data exchange provided in the at least some embodiments realizes openness, interconnectivity and sharing of the big data and fully mobilize isolated and inactive big data to fully participate in big data transaction activities for production and life and create values which is derived from the big data.

Through description of the at least some embodiments, the skilled person in the art can clearly understand that the method can be realized by means of software and necessary universal hardware platforms, and definitely can also be implemented through hardware. Based on the understanding, the technical scheme of at least some embodiments of the present disclosure can be embodied in the form of a computer software product. The computer software product can be stored in a storage medium (such as a ROM/RAM, a magnetic disk and an optical disk), including program instructions for enabling one terminal device (which can be one of a mobile phone, a computer, server, and a network device) to execute the method mentioned in each exemplary embodiment of the present disclosure.

In an exemplary embodiment of the present disclosure, a storage medium is further provided. Optionally, in this exemplary embodiment, the storage medium is arranged to store program codes of method steps for executing the method mentioned in each exemplary embodiment of the present disclosure.

Optionally, in this exemplary embodiment, the storage medium includes, but not limited to: a USB flash disk, a read-only memory, a random access memory, a mobile hard disk, a magnetic disk and an optical disk, which are capable of storing program codes.

Optionally, in this exemplary embodiment, a processor executes the program codes stored in the storage medium so as to realize the method mentioned in each exemplary embodiment of the present disclosure.

Obviously, those skilled in the art should know that each component or each step of the present disclosure is implemented by a universal computing device, and the components or steps are concentrated on a single computing device or distributed on a network formed by multiple computing devices, and are optionally implemented by program codes executable for the computing devices, so that the components or steps are stored in a storage device for execution with the computing devices. The shown or described steps are executed in sequences different from those shown or described here in some circumstances, or form each integrated circuit component respectively, or multiple components or steps therein form a single integrated circuit component for implementation. As a consequence, the present disclosure is not limited to any specific hardware and software combination.

The above are the exemplary embodiments of the present disclosure and not intended to limit the present disclosure. For those skilled in the art, the embodiments of the present disclosure have various modifications and variations. Any modifications, equivalent replacements, improvements and the like made within the scope protection as claimed in the claims of the present disclosure shall fall within the scope of protection of the present disclosure.

INDUSTRIAL APPLICABILITY

According to at least some embodiments of the present disclosure, the big data source collects various data and provides the various data to the big data exchanger; the big data exchanger receives the various data imported from the big data source, processes the various data to obtain processed data, and exports the various data and the processed data to the big data target according to the data request of the big data target; the big data target sends the data request to the big data exchanger and receives the various data and the processed data, corresponding to the data request, which are exported from the big data exchanger, so that the problems that the big data cannot be opened, interconnected and shared in related art are solved, and openness, interconnectivity and sharing of the big data are achieved.

What is claimed is:

1. A system for big data exchange, comprising: a hardware processor, configured to execute program components stored in a memory, wherein the program components comprise: a big data source, a big data exchanger and a big data target; wherein the big data source is arranged to collect various data, and provides the various data to the big data exchanger;

the big data exchanger is arranged to receive the various data imported by the big data source, process the various data to obtain processed data, and export the various data and the processed data to the big data target according to a data request of the big data target;

the big data target is arranged to send the data request to the big data exchanger and receive the various data and the processed data correspond to the request exported by the big data exchanger;

wherein the big data source comprises: a data production component, a data owner component, a data broker component, a data proxy component, a data ingest adaptation component and a data collection component, wherein the data production component is arranged to produce data or combining several types of data into new data;

the data owner component is arranged to hold data and authorize to access the data;

the data broker component is arranged to not directly produce data, and purchase the data from the data production component or the data owner component through an authorization protocol;

the data proxy component is arranged to not directly produce data and replace the data production component to hold data;

the data ingest adaptation component is arranged to receive data from an external data source and adapt the data ingested from the external data source according to a processing demand of the big data source;

the data collection component is arranged to collect data from at least one of the data production component, the data proxy component, the data owner component, the data broker component and the data ingest adaptation component, and adapt, configure and manage different collection methods, collection interfaces and data processing ways.

2. The system as claimed in claim 1, wherein the big data exchanger comprises at least one of the following: a data import component, a data collection component, a data preparation component, a data analysis component, a data visualization component and a data export component; wherein the data import component is arranged to receive data from the big data source, and store and/or cache the data, wherein a way of receiving, by the data import component, the data comprises at least one of the following: data query, data request, data fetching, data provision, data discovery, metadata publishing and metadata notification;

the data collecting component is arranged to collect data from imported data and perform preliminary processing on the data, and provides a corresponding preliminary processing result to the data preparation component and the data export component;

the data preparation component is arranged to perform preparation processing on the preliminary processed data and provide a corresponding preparation processing result to the data analysis component and the data export component, wherein the preparation processing comprises at least one of the following: data cleaning, data conversion, data decomposition, data verification, data fusion, data aggregation, data clustering, data sorting, data abstraction, data classification, data encryption and data integration;

the data analysis component is arranged to, according to the big data science, analyze data which is processed through data preparation by using a preset algorithm and extract knowledge data from the analyzed data, and provide a corresponding analysis processing result to the data visualization component and the data export component;

the data visualization component is arranged to perform visual processing on data which is processed through data analysis, and provides a corresponding visual processing result to the data export component;

the data export component is arranged to export the data imported from the big data source and visual processed data to the big data target.

3. A method for big data exchange, comprising:

collecting, by a big data source, various data, and providing, by the big data source, the various data to a big data exchanger;

receiving, by the big data exchanger, the various data imported from the big data source, processing, by the big data exchanger, the various data to obtain processed data, and exporting, by the big data exchanger, the various data and the processed data to a big data target according to a data request of the big data target;

sending, by the big data target, the data request to the big data exchanger, and receiving, by the big data target, the various data and the processed data, corresponding to the data request, which are exported from the big data exchanger;

wherein collecting, by the big data source, various data, and providing, by the big data source, the various data to the big data exchanger comprises:

collecting, by the big data source, various data, and providing, by the big data source, the various data to the big data exchanger through a data production component, a data owner component, a data broker component, a data proxy component, a data ingest adaptation component and a data collection component, wherein the data production component is arranged to produce data or combining several types of data into new data;

the data owner component is arranged to hold data and authorize to access the data;

the data broker component is arranged to not directly produce data, and purchase the data from the data production component or the data owner component through an authorization protocol;

the data proxy component is arranged to not directly produce data and replace the data production component to hold data;

the data ingest adaptation component is arranged to receive data from an external data source and adapt the data ingested from the external data source according to a processing demand of the big data source;

the data collection component is arranged to collect data from at least one of the data production component, the data proxy component, the data owner component, the data broker component and the data ingest adaptation component, and adapt, configure and manage different collection methods, collection interfaces and data processing ways.

4. The method as claimed in claim 3, wherein collecting, by the big data source, various data, and providing, by the big data source, the various data to the big data exchanger through the data production component, the data owner component, the data broker component, the data proxy component, the data ingest adaptation component and the data collection component comprising at least one of the following:

acquiring, by the big data source, original data from the data production component, the data proxy component and the data owner component;

acquiring, by the big data source, original data from the data owner and the data broker;

ingesting, by the big data source, data of an external data source from the data ingest adaptor.

5. The method as claimed in claim 3 wherein receiving, by the big data exchanger, the various data imported from the big data source, processing, by the big data exchanger, the various data to obtain processed data, and exporting, by the big data exchanger, the various data and the processed data to the big data target according to the data request of the big data target comprising:

performing, by the big data exchanger, corresponding processing on data imported from the big data source through at least one of data collection, data preparation, data analysis and data visualization to output the processed data, wherein the processed data comprises at least one of the following: collected data, prepared data, analyzed data and action data, and exporting, by the big data exchanger, the various data and the processed data to the big data target according to the data request of the big data target.

6. The method as claimed in claim 3, wherein receiving, by the big data target, the various data and the processed data, corresponding to the data request, which are exported from the big data exchanger comprises:

receiving, the big data target, the various data and at least one of collected data, prepared data, analyzed data and action data, corresponding to the data request, which are exported from the big data exchanger.

7. The method as claimed in claim 6, wherein the various data imported from the big data source refers to received, stored and/or cached data imported from the big data source and data annotated by metadata;

collected data refers to outputted data which is processed through collecting;

prepared data refers to outputted data which is processed through preparing, wherein the prepared data comprises at least one of the following: cleaned data, conversed data, decomposed data, verified data, fused data, aggregated data, clustered data, sorted data, abstracted data, classified data, encrypted data and integrated data;

analyzed data refers to outputted data which is processed through data analysis;

action data refers to outputted data which is processed through visualization.

8. The method as claimed in claim 3, wherein exporting, by the big data exchanger, the various data and the processed data to the big data target according to the data request of the big data target comprises:

determining, by the big data exchanger, whether to process or directly export the various data and the processed data;

when the big data exchanger determines to directly export the various data and the processed data, exporting, by the big data exchanger, the various data and the processed data to the big data target according to the data request of the big data target;

when the big data exchanger determines to process the various data and the processed data, continuously processing, by the big data exchanger, the various data to obtained the processed data and continuously processing, by the big data exchanger, the processed data to obtain continuously processed data.

9. The method as claimed in claim 3, wherein exporting, by the big data exchanger, the various data and the processed data to the big data target according to the data request of the big data target comprises:
- determining, by the big data exchanger, whether to process or directly export the various data and the processed data;
- when the big data exchanger determines to directly export the various data and the processed data, exporting, by the big data exchanger, the various data and the processed data to the big data target according to the data request of the big data target;
- when the big data exchanger determines to process the various data and the processed data, continuously processing, by the big data exchanger, the various data to obtained the processed data and continuously processing, by the big data exchanger, the processed data to obtain continuously processed data.

10. The method as claimed in claim 4, wherein exporting, by the big data exchanger, the various data and the processed data to the big data target according to the data request of the big data target comprises:
- determining, by the big data exchanger, whether to process or directly export the various data and the processed data;
- when the big data exchanger determines to directly export the various data and the processed data, exporting, by the big data exchanger, the various data and the processed data to the big data target according to the data request of the big data target;
- when the big data exchanger determines to process the various data and the processed data, continuously processing, by the big data exchanger, the various data to obtained the processed data and continuously processing, by the big data exchanger, the processed data to obtain continuously processed data.

11. The method as claimed in claim 5, wherein exporting, by the big data exchanger, the various data and the processed data to the big data target according to the data request of the big data target comprises:
- determining, by the big data exchanger, whether to process or directly export the various data and the processed data;
- when the big data exchanger determines to directly export the various data and the processed data, exporting, by the big data exchanger, the various data and the processed data to the big data target according to the data request of the big data target;
- when the big data exchanger determines to process the various data and the processed data, continuously processing, by the big data exchanger, the various data to obtained the processed data and continuously processing, by the big data exchanger, the processed data to obtain continuously processed data.

12. The method as claimed in claim 6, wherein exporting, by the big data exchanger, the various data and the processed data to the big data target according to the data request of the big data target comprises:
- determining, by the big data exchanger, whether to process or directly export the various data and the processed data;
- when the big data exchanger determines to directly export the various data and the processed data, exporting, by the big data exchanger, the various data and the processed data to the big data target according to the data request of the big data target;
- when the big data exchanger determines to process the various data and the processed data, continuously processing, by the big data exchanger, the various data to obtained the processed data and continuously processing, by the big data exchanger, the processed data to obtain continuously processed data.

13. The method as claimed in claim 7, wherein exporting, by the big data exchanger, the various data and the processed data to the big data target according to the data request of the big data target comprises:
- determining, by the big data exchanger, whether to process or directly export the various data and the processed data;
- when the big data exchanger determines to directly export the various data and the processed data, exporting, by the big data exchanger, the various data and the processed data to the big data target according to the data request of the big data target;
- when the big data exchanger determines to process the various data and the processed data, continuously processing, by the big data exchanger, the various data to obtained the processed data and continuously processing, by the big data exchanger, the processed data to obtain continuously processed data.

* * * * *